United States Patent Office 3,748,216
Patented July 24, 1973

3,748,216
SOFT CONTINUOUS FILAMENT WEBS CONTAINING ENCAPSULATED FILAMENTS
Robert J. Brock, Appleton, Wis., assignor to Kimberly-Clark Corporation, Neenah, Wis.
Filed Mar. 22, 1971, Ser. No. 126,524
Int. Cl. B32b 7/14
U.S. Cl. 161—148                                    6 Claims

ABSTRACT OF THE DISCLOSURE

Nonwoven webs comprised of a plurality of substantially continuous and randomly deposited, molecularly oriented filaments of a thermoplastic polymer are disclosed. The webs contain easily releasable, intermittent autogeneous bonds at a plurality of filament crossover points. In addition, the webs are stabilized by means of an easily disruptable polymeric material which encapsulates the filaments at intermittent, discrete areas. The webs can be readily prepared by lightly heat bonding a flimsy and tenuous continuous filament web to form easily releasable autogenous bonds and, thereafter, printing the web with a disruptable polymeric material. Webs so formed possess particularly outstanding strength characteristics, especially with respect to energy absorption and tensile and tear strength. In addition, the softness of the webs can be enhanced by a moderate "working" of the web so as to break the easily releasable autogenous bonds.

BACKGROUND OF THE INVENTION

The present invention relates to fabric-like webs of continuous filaments of a thermoplastic polymer and, more particularly, to such webs wherein web stabilization is accomplished in a particularly desirable manner.

Nonwoven webs comprised of a plurality of substantially continuous and randomly deposited, molecularly oriented filaments of a thermoplastic polymer are widely known. Among others, the following patents illustrate a variety of methods for preparing such webs: Kinney (U.S. Pats. 3,338,992 and 3,341,394); Levy (U.S. Pat. 3,276,944); Peterson (U.S. Pat. 3,502,538); Hartmann (U.S. Pats. 3,502,763 and 3,509,009); Dobo et al. (U.S. Pat. 3,542,615); and Harmon (Canadian Pat. 803,714).

While many different methods are illustrated for initially preparing such continuous filament webs, the available methods generally have at least three common features. First, the methods of preparation involve continuously extruding a thermoplastic polymer (either from the melt or a solution) through a spinneret in order to form discrete filaments. Thereafter, the filaments are drawn (either mechanically or pneumatically) in order to molecularly orient the polymer filaments and achieve tenacity. Lastly, the filaments are deposited in a substantially random manner onto a carrier belt or the like to form a web with substantially isotropic physical characteristics.

Continuous filament webs formed in the above described general manner are characterized by a typically fabric-like softness, hand, and drape, and thus appear to be quite suitable for many fabric applications where conventional woven fabrics or the like have been conventionally employed. However, as initially prepared, continuous filament webs are ordinarily very unstable, thus lacking adequate strength to permit their completely successful use in applications such as bed linens, garments, drapery materials, etc. Consequently, it is conventional practice to stabilize the continuous filament webs by bonding together the filaments contained therein either autogenously or by means of independently applied adhesives. With respect to adhesive bonding, many problems are encountered since it is difficult to print adhesives on the initially formed flimsy and tenuous web.

While known bonding techniques increase the stability of continuous filament webs, a problem exists in achieving such increased stability without adversely affecting other desirable web characteristics such as its fabric like drape, softness and feel. Web stabilization techniques involving overall web bonding wherein the filaments in the web are united at substantially all filament cross-over points generally produce a web which is harsh and stiff. While it is true that the initial stiff and harsh feel of overall bonded webs is frequently diminished when the web is actually used, presumably due to some bond breakage, such softening is generally accompanied by other undesirable features such as a reduction in surface abrasion resistance and an overall reduction in web strength and stability.

Other web stabilization techniques such as those which involve intermittent web bonding are also not completely satisfactory. The problem associated with stabilizing webs by means of intermittent bonding is to achieve an adequate level of bonding to obtain sufficient surface abrasion resistance and other desirable strength characteristics, and yet preserve the fabric-like characteristics of the continuous filament web.

In particular, it has been difficult to obtain an intermittently bonded continuous filament web wherein the web is textile-like in drape, feel, and softness, has good surface abrasion resistance and has good strength characteristics particularly with respect to the web's capacity to absorb energy under strain. This latter characteristic of energy absorption is indicative of the ability of the web to deform without substantial filament fracture under strain. An increased capacity for absorbing energy is particularly important when the web is to be used in applications such as garments and sheets where, in use, the web will be constantly subjected to strains at localized areas such as the toe area in bed sheets and the elbow and knee areas in wearing apparel. In the absence of a good capacity for absorbing energy, the use of continuous filament webs in such applications is accompanied by significant web failure at those localized regions where strains are applied.

Copending Hansen and Pennings application Ser. No. 121,880, filed on Mar. 8, 1971, entitled "Pattern Bonded Continuous Filament Web," now abandoned, and refiled on Sept. 1, 1971, Ser. No. 177,077, describes a manner in which acceptable webs can be prepared. The present invention is directed to an alternate method for preparing acceptable webs.

OBJECTS OF THE INVENTION

Accordingly, it is a principal object of the present invention to provide a stabilized nonwoven continuous filament web which is soft and drapeable and, in addition, is characterized by a high degree of surface abrasion resistance combined with improved strength properties with respect to energy absorption, tensile strength, and tear strength.

An additional object is to provide a web having the characteristics identified in the principal object wherein the web is principally stabilized by an independently applied polymeric material. Closely related to this object, it is a further object of the present invention to provide a method for preparing a web having the above-stated characteristics whereby an initially formed flimsy and tenuous continuous filament web is easily initially stabilized in order to permit efficient printing thereon.

Other objects and advantages of the present invention will become apparent by reference to the following description and the accompanying drawings in which.

SUMMARY OF THE INVENTION

Figure 1:
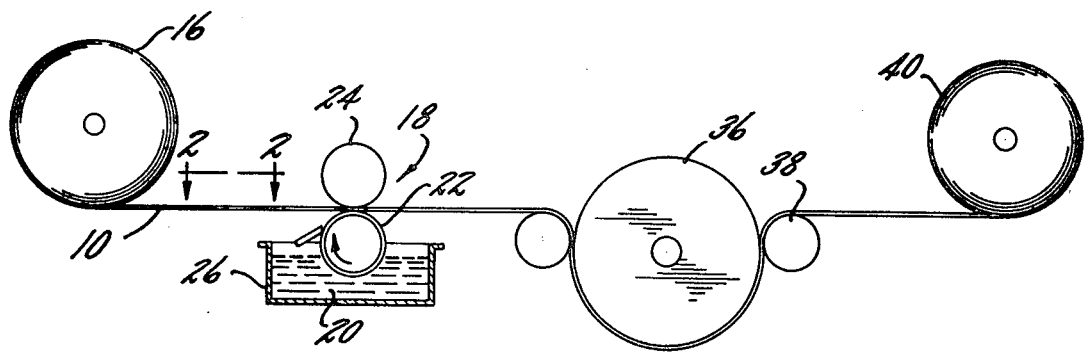
FIG. 1 is a schematic illustration of apparatus, and shows one means for forming the nonwoven webs of the present invention.
Figure 2:
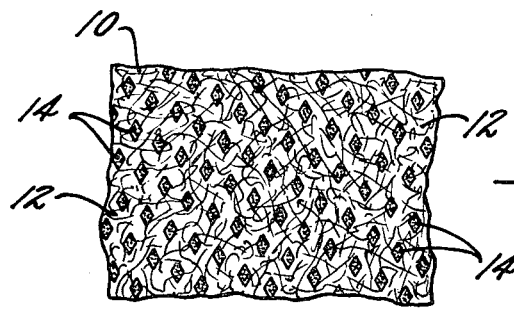
FIG. 2 is a plan view taken along line 2—2 of FIG. 1.

Briefly stated, webs are prepared in accordance with the present invention by lightly heat bonding an initially unstable continuous filament web so as to form easily releasable autogenous bonds at a plurality of filament crossover points, printing a pattern of a disruptable polymeric material onto the lightly bonded web, and, forcing the polymeric material into the web such that it encapsulates the continuous filaments in distinct areas of the web.

The distinctive combination of web stabilizing features present in webs prepared as above described i.e., the easily releasable autogenous bonds and the disruptable polymeric material, are believed to contribute to the desirable attributes of the web and the fact that it can be efficiently prepared. Pre-bonding of the continuous filament web permits conventional printing of the polymeric material onto the web. Moreover the facts that the filaments are lightly bonded in a manner such that they can easily pull free from one another contributes to the overall softness and drapeability of the web. Furthermore, the existence of such easily releasable bonds in combination with the fact that the encapsulating material is disruptable and does not form strong bonds with the filaments is believed to aslo directly contribute to the desirable energy absorbing characteristics and other strength properties of the web.

Energy absorption indicates the ability of a material to elongate under strain while at the same time effectively supporting the applied load during elongation. Thus, a material with a high capacity for absorbing energy can possess a high tensile strength which can be maintained over a significant elongation of the material. In other words, a material with good energy absorbing characteristics can "give" without rupturing when strained.

The capacity for absorbing energy is particularly desirable in fabric-like articles such as garments and sheets which are constantly subjected to localized strains such as at the toe area in bed sheets and the elbow and knee area in wearing apparel. The ability to "give" without rupturing while supporting an applied strain, i.e., the ability to absorb energy, permits the fabric to comfortably accommodate an applied strain without undesirable fabric deterioration.

DESCRIPTION OF THE PREFERRED EMBODIMENTS

While the present invention is susceptible of various modifications and alternative constructions, there will herein be described in detail the preferred embodiments. It is to be understood, however, that it is not intended to limit the invention to the specific forms disclosed. On the contrary, it is intended to cover all modifications and alternative constructions falling within the spirit and scope of the invention as expressed in the appended claims.

(a) Description of preparation of continuous filament web with easily releasable bonds The present invention concerns nonwoven webs of substantially continuous and randomly deposited, molecularly oriented filaments of a thermoplastic polymer. The manner in which the web is initially prepared, i.e., the web laydown technique, is not especially important in achieving the advantages of the present invention and any of a variety of known techniques such as described in the aforementioned patents can be employed. A particularly useful method of web laydown is also described in U.S. patent application, Ser. No. 865,128, entitled "Continuous Filament Nonwoven Web and Process for Producing the Same," filed on Oct. 9, 1969, now U.S. Pat. No. 3,692,618.

The technique described in Ser. No. 865,128 permits especially high rates of web formation. The disclosed method involves conventional spinning of continuous filaments of a synthetic polymer by, for example, extruding the polymer through a multiple number of downwardly directed spinning nozzles, preferably extending in a row or multiple number of rows. The filaments as they are spun, are gathered into a straight row of side-by-side, evenly spaced apart, untwisted bundles each containing at least 15 and preferably from 50 up to 1000 filaments. These filament bundles are simultaneously drawn downwardly at a velocity of at least 3,000 meters per minute, and preferably from 3,500 to 8,000 meters per minute, in individually surrounding gas columns flowing at a supersonic velocity and directed to impinge on a substantially horizontal carrier. The gathering of the filaments into the untwisted bundles and their drawing and directing to impinge on the carrier is preferably effected by passing the bundles through air guns which surround the filaments with a column or jet of air which is directed downward at supersonic velocity. The air guns are arranged so as to extend in one or more rows extending across the carrier at right angles to its direction of movement, so that the bundles confined in the gas columns as the same strike the moving carrier extend in a line or row at right angles across the carrier. In order to enhance intermingling of the bundles, they can be made to oscillate, the plane of oscillation being transverse to the direction of carrier movement. The carrier can be a conventional carrier used in a nonwoven art, such as an endless carrier or belt screen or the upper portion of a drum, as for example a screen drum.

When prepared as described above, the filament bundles, containing a number of parallel filaments, are laid down on the carrier in a loop-like arrangement with primary loops extending back and forth across the width of a section defined by the impingement of the air column from one air gun on the carrier. Before and as the parallel filament bundles impinge the carrier, they are broken up into sub-bundles containing a lesser number of parallel filaments and forming secondary smaller loops and swirls. The secondary loops and swirls overlap each other, and those of adjacent sections, to result in substantially complete intermingling with the overlapping portions of adjacent sections. Thus, the laid-down filament bundles form a continuous uniform nonwoven web.

While, as indicated above, the manner in which the web is initially formed is not particularly important with respect to the present invention, the nature of the thermoplastic polymer employed to form the web and the manner in which the web is bonded after formation are important in order to realize the advantages of the present invention. Concerning the nature of the thermoplastic polymer, it is important that it be of a type which does not strongly adhesively bond with the material subsequently used to achieve filament encapsulation. It is believed that when such strong adhesive bonding is avoided, the filaments can pull free from the encapsulating material when the web is strained. This feature, in combination with disruption of the polymeric encapsulating material, is considered to be important in avoiding filament fracture, thus permitting the filaments to be continuously available as load bearing members during the straning process. Suitable thermoplastic polymers for use herein include the naturally non-adhering polymers such as hydrocarbons, e.g., polypropylene, polyethylene, polybutene, polyisobutylene, polybutadine, as well as mixtures of such thermoplastic polymers and copolymers thereof. Also, other polymers such as polyamides, polyesters, etc. can be used so long as the chosen polymeric encapsulating material does not strongly adhere thereto. Of the polymers, polypropylene is particularly preferred since continuous filament webs thereof can be simply and inexpensively prepared.

Turning now to the bonding of the continuous filament web, it has been previously indicated that such bonding is particularly desirable since it permits the web to be conveniently handled during the encapsulating procedure. In this respect, it should be noted that the web, as initially formed, is very flimsy and tenuous and in the absence of pre-bonding it is very difficult to print the web or otherwise handle it. However, apart from this aspect, it is also believed that web pre-bonding as hereinafter discussed contributes to the desirable energy absorbing characteristics and other strength properties of the resulting web.

In accordance with the present invention, bonding of the continuous filament web is accomplished in a manner such that the filaments can easily pull free from their particular bond areas when the web is only slightly "worked" or placed under only a small amount of strain. On working or straining of the web it is believed that these bonds serve as initial load bearing sites. As the web is strained further, these bonds disappear due to filament release therefrom and the load bearing function in the web is transferred to the disruptable polymeric material with the filaments substantially intact.

An important aspect which should be appreciated in connection with the preparation of webs containing such easily releasable bonds is that, apart from their further treatment with the encapsulating material, the webs alone would have only very limited usefulness since their strength and energy absorbing characteristics are substantially less than optimum. This feature, however, emphasizes the unobvious character of the present invention since, when such "underbonded" webs are subsequently treated in the manner hereinafter described, they do exhibit very desirable strength, energy absorption, and tear resistance.

Due to the difficulty in bonding thermoplastic polymer filaments with an independently applied adhesive, autogenous heat bonding is employed to form the easily releasable bonds. Furthermore, it is preferred that web pre-bonding be accomplished only in an intermittent fashion rather than at all of the filament crossover points. Webs containing such an intermittent pattern of easily releasable bonds are flexible and drapeable and thus contribute to the overall fabric-like character of the final web. A further feature associated with the use of intermittently bonded webs is that the material employed for encapsulation can be easily forced through the continuous filament web so as to encapsulate the filaments. However, overall initial bonding, i.e., bonding at substantially all filament crossover points, can be used. While the final web is somewhat soft, it becomes significantly softer with only slight web "working" which can be accomplished immediately after preparation or by the end user.

One arrangement of apparatus which can be employed for preparing webs containing intermittent, easily releasable autogenous bonds is depicted in the aforementioned Hansen and Pennings, U.S. application Ser. No. 121,880, filed on Mar. 8, 1971, entitled Pattern Bonded Continuous Filament Web. As shown therein, webs containing a plurality of intermittent autogenous bonds can be prepared by passing a continuous filament web between the nip formed by two heated rolls, one of which contains a plurality of raised points on its surface. The pattern of the raised points is generally regular and is such that the total bonded area of the web is about 5–50% and preferably 10–25%. The individual bonds are present in a density of about 50–3200/in.$^2$ and preferably 100–500/in.$^2$.

While the general technique of web bonding using two heated rolls disclosed in Hansen and Pennings can be conveniently employed in forming webs useable herein, it should be appreciated that the principal object of the Hansen and Pennings application is to prepare webs which themselves contain optimum energy absorbing characteristics. However, for the purpose of the present invention which involves encapsulation, such webs are not desirable. On the other hand, those webs which, for the purposes disclosed in Hansen and Pennings are "underbonded," are those useful herein. Final webs prepared with such initial "underbonded" webs, have been found to have remarkably good energy absorbing and other strength characteristics.

When viewed under a microscope, the filaments in easily releasable bond areas for the most part have not lost their separate identities as filaments and appear as if to be only cohesively secured together.

Based on the techniques for establishing bonding intensity described in the Hansen and Pennings application, webs useful herein which contain easily releasable bonds are characterized by an unfused bond area coefficient ($\mu$bac.) of greater than about 55%, and preferably greater than about 65%. As disclosed in this application, the $\mu$bac. for a given web is determined by randomly cutting 10 one inch square samples from a web and thereafter allocating each of the bonds in each of the ten samples to one of the following three categories: (1) 0–33% fusion; (2) 33–66% fusion; (3) 66–100% fusion. The percent fusion in a given bond is determined by observing the bond at 100× magnification under a stereomicroscope with a grid having ten equal area portions placed over the bond. The fused area of a particular bond is that area wherein the presence of individual filaments cannot be identified throughout the area. The unfused bond area coefficient is that percentage of the total number of bonds which are categorized as 0–33% fused.

Regarding the basis weight of continuous filament webs useful herein, basis weights on the order of about 0.3–3 oz./yd.$^2$ are ordinarily employed. Since it becomes somewhat difficult to achieve penetration of the encapsulating material through the web at basis weights in excess of about 1.5 oz./yd.$^2$, lower weights are preferred. Ordinarily, webs having a basis weight of about 0.3–0.8 oz./yd.$^2$ with filaments having deniers of about 0.5–10, and preferably 0.8–3, are most useful.

(b) Description of web encapsulation

Turning now to the drawing, FIG. 1 schematically illustrates one manner in which webs of the present invention can be prepared. As shown, a web 10 of substantially continuous filaments 12 of a thermoplastic polymer containing a plurality of easily releasable autogenous bonds 14 is unwound from a roll 16 and passed to a printing station 18. At the printing station, a discontinuous pattern of polymeric material 20 is printed onto the bottom surface of the web. Such is accomplished by passing the web between the printing roll 22 and back-up roll 24, the printing roll 22 being partially submerged in the tank 26 containing the polymeric material 20. The surface of the printing roll 22 is provided with an intaglio cell pattern which serves to pick up the material 20 from the tank 26 and transfer the material to the bottom surface of the web 10. A doctor blade can be used to control the quantity of material applied to the roll.

The cells on the roll 22 can be in any patterned configuration; however, so as not to adversely affect web drapeability, it is important that the pattern be substantially open and discontinuous and that, after printing, the area of the web which is occupied by the polymeric material 20 be not more than about 25% of the total area, and preferably only about 15% or less of the area. About 0.15–0.75 oz./yd.$^2$ of material, and preferably 0.3–0.6 oz./yd.$^2$ of material, is employed.

Following application of the polymeric material 20, encapsulation is then effected by passing the web in contact with the heated drum 36 while under compressive pressure. By so doing, the polymeric material encapsulates the thermoplastic filaments.

The selection of the polymeric material 20 constitutes an important aspect of the present invention. As indicated previously, the material should not form strong adhesive bonds with the polymer filaments. In addition, the material should, in its solidified condition, be disruptable so that when, under web strain, the load bearing function is transferred to the discrete areas of polymeric material (i.e., after filament release from the autogenous bonds), the material can itself pull apart, thus freeing the encapsulated filaments held in the discrete areas of material without an accompanying substantial amount of filament fracture. On disruption of the polymeric material, the load bearing function is transferred to the continuous filaments themselves, most of which are still intact and, accordingly, can serve as efficient load bearing members.

As should be apparent in view of the above discussion, the cohesive strength of the chosen polymeric material must be greater than the strength of the easily releasable autogenous bonds in order to obtain the indicated "programed" filament release. For a similar reason, the polymer cohesive strength should be less than the tenacity of the filaments in the continuous filament web in order to obtain filament release without fracture. On the other hand, so as to maximize energy absorption during strain, the disruption of the material should involve considerable "work" and, to this end, it is preferred that the cohesive strength of the material approach and be only slightly less than the tenacity of the polymer filaments.

While it should be apparent that a variety of "soft" polymeric materials can be employed including those applied as hot melts, latexes, plastisols, etc., a plasticized polyvinyl chloride polymer is preferably used. Such polymers can be conveniently applied to the web 10 as a plastisol, i.e., a sol of polymer particles in a liquid plasticizer such as dioctyl phthalate or the like., and thereafter cured to a desirable level of strength while remaining flexible. Useful application viscosities for plastisols are on the order of about 800–6000 cps. and generally about 1000–3000 cps.

Turning now to the details of encapsulation as shown in the illustrated embodiment of the present invention, it should be noted that several features are important. The compressive pressure applied to the laminate must be such that the polymeric material applied to the web 10 at the printing station 18 sufficiently penetrates the web to encapsulate the filaments throughout the web thickness and particularly to the web surface opposite to the printing surface. Such insures surface abrasion resistance. However, polymeric material spreading on the outer surfaces of the web and within the web should be minimized. Such spreading gives rise to an undesirable increase in web stiffness.

With particular reference to FIG. 1, suitable web formation with a plastisol polymeric material can be accomplished by appropriately coordinating the temperature of the heated drum 36, the time during which the laminate is in contact with the drum (dwell time), and the pressure exerted on the web in the nip formed between the drum and the roll 32. Since the viscosity of the plastisol at the roll 32—drum 36 nip is about the same as its application viscosity, and thus is low, care must be exercised at this point to avoid excessive material spreading. Nip pressures between the roll 32 and the drum 36 on the order of about 30–70 pli are sufficient to achieve a desirable filament encapsulation.

As the web travels on the drum surface, plastisol temperature and viscosity rise, and the problem of excessive adhesive spreading becomes less significant. Regarding travel on the drum surface, the web must remain in contact with the surface for a sufficient time to permit the plastisol to cure and develop desirable strength characteristics. For drum temperatures of about 250° F.–300° F. dwell times of .5–5 seconds are usually sufficient. Alternatively, a belt can be brought into contact with the printed web prior to its contact with the drum so as to provide compressive pressure to achieve filament encapsulation.

Figure 3:
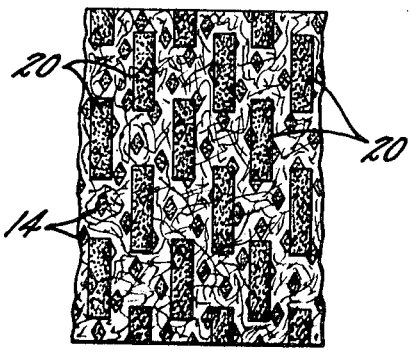
FIG. 3 is a fragmentary plan view of a web prepared as illustrated by FIG. 1.

FIG. 3 illustrates a web prepared by the method described above. The individual filaments in the web 10 are autogenously bonded together by means of the intermittent pattern of easily releasable bonds 14. Filament encapsulation is achieved by means of the spaced pattern of cured plastisol 20.

The web illustrated in FIG. 3 is characterized by good aesthetic properties with respect to appearance and feel, and additionally possesses highly desirable isotropic stress and strain characteristics. In addition the web possesses a high tensile and tear strength and a high capacity for absorbing energy.

While the present invention is principally based on the unique combination of bonding features previously discussed, viz., the easily releasable autogenous bonds and the use of a disruptable polymeric material, it is also believed that desirable energy absorbing, tear, and strength characteristics can be even further enhanced by selection of particular polymeric material print patterns. In particular, it has been found that it is desirable to employ a brick shaped print pattern which simulates a plain weave with the warp and fill weave directions at about 45° to the normal web machine direction. A further desirable pattern is a slant brick with the bricks at about 70° to the machine direction.

I claim as my invention:

1. An improved process for preparing a stabilized nonwoven web of substantially continuous and randomly deposited, molecularly oriented filaments of a thermoplastic polymer, said process comprising autogenously pre-bonding an unstable nonwoven web of continuous filaments at a plurality of filament crossover points with easily releasable bonds and, therefater, encapsulating the filaments in said pre-bonded web at intermittent, discrete areas with a polymeric material having a cohesive strength greater than the autogenous bond strength but slightly less than the filament tenacity.

2. The process of claim 1 containing the further step of straining the pre-bonded encapsulated web an amount which destroys the autogenous bonds while not substantially disrupting the polymeric material.

3. The process of claim 2 wherein autogenous pre-bonding is accomplished in an intermittent pattern.

4. An improved nonwoven web of substantially continuous and randomly deposited, molecularly oriented filaments of a thermoplastic polymer, said nonwoven web containing, at a plurality of filament crossover points, autogenous bonds of low intensity such that under strain the bonds disappear due to filament release without substantial filament fracture; said web also containing a polymeric material which encapsulates said filaments at intermittent, discrete areas, said polymeric materials having a cohesive strength greater than the autogenous bond strength but slightly less than the filament tenacity such that disruption of the polymeric material is effected under strain prior to excessive filament failure.

5. The web of claim 4 wherein the autogenous bonds are present in an intermittent pattern.

6. The web of claim 5 wherein the polymeric material is a plasticized vinyl chloride polymer or copolymer and the thermoplastic polymer is polypropylene.

References Cited

UNITED STATES PATENTS

| | | | |
|---|---|---|---|
| 3,276,944 | 10/1966 | Levy | 161—150 |
| 3,484,330 | 12/1969 | Sokolowski et al. | 161—148 |
| 3,047,444 | 7/1962 | Harwood | 161—146 |
| 3,238,055 | 3/1966 | Brightwell | 161—DIG. 2 |

GEORGE F. LESMES, Primary Examiner

J. J. BELL, Assistant Examiner

U.S. Cl. X.R.

117—38; 156—290, 291, 306; 161—140, 150, 402